Nov. 20, 1945.  H. J. WAGNER  2,389,569
ELECTRODE HOLDER
Filed Feb. 16, 1944   2 Sheets-Sheet 1
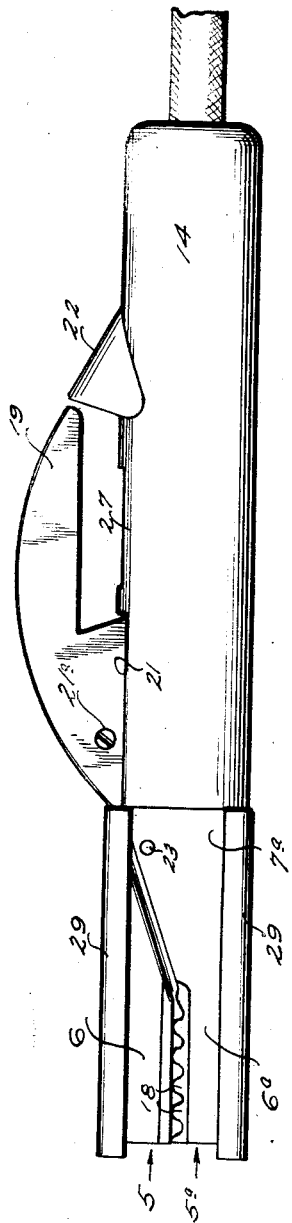
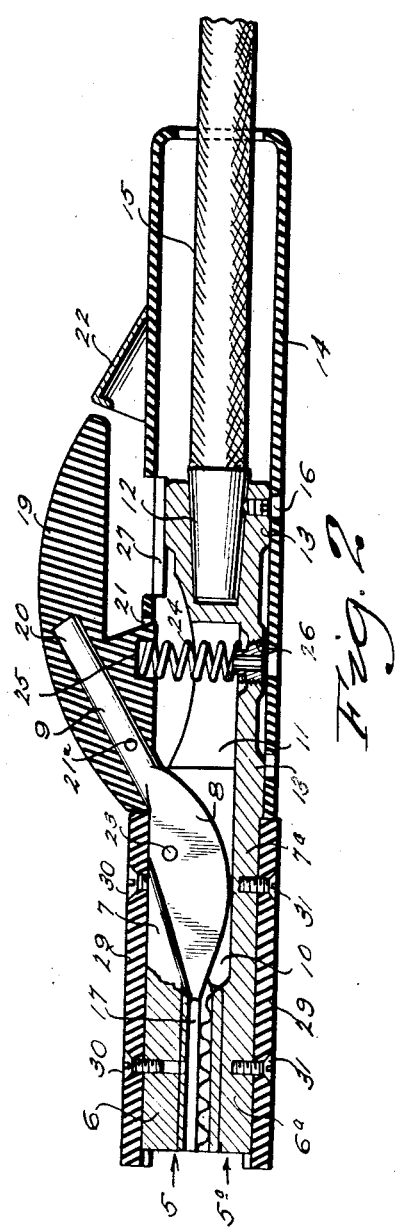
Inventor
Henry J. Wagner
By Clarence A. O'Brien
and Harvey B. Jacobson
Attorneys Nov. 20, 1945.  H. J. WAGNER  2,389,569
ELECTRODE HOLDER
Filed Feb. 16, 1944   2 Sheets-Sheet 2
Fig. 3.
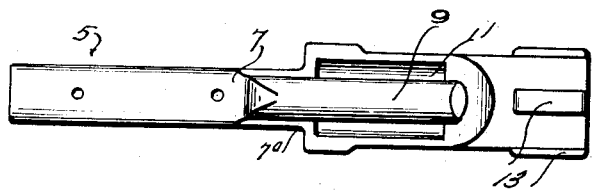
Fig. 4.
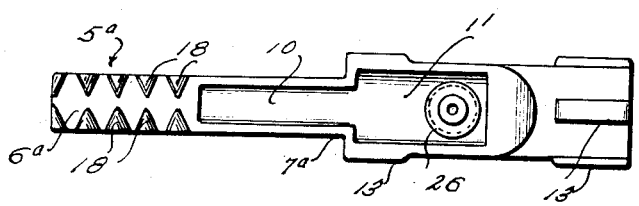
Fig. 5.
Fig. 6.
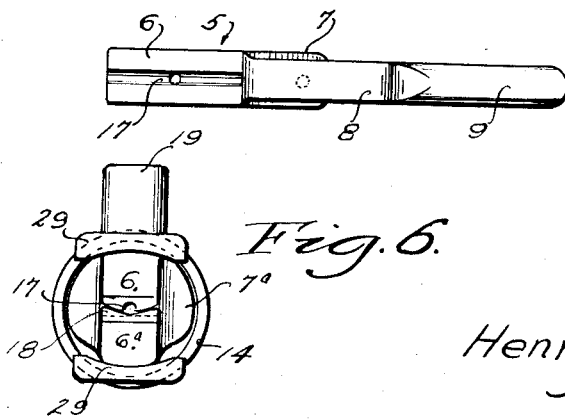
Inventor
Henry J. Wagner
By Clarence A. O'Brien
and Harvey B. Jacobson
Attorneys Patented Nov. 20, 1945

2,389,569

UNITED STATES PATENT OFFICE 2,389,569

ELECTRODE HOLDER

Henry J. Wagner, Jackson, Mo.

Application February 16, 1944, Serial No. 522,637

3 Claims. (Cl. 219—8)

This invention relates to certain new and useful improvements in the type of electrode holders shown in U. S. Letters Patent No. 2,179,440, issued November 7, 1939.

The primary object of the present invention is to generally simplify and improve the construction of electrode holders of the above type, whereby the same may meet with the requirements for a successful commercial use.

Other and more specific objects and features of the present invention will become apparent from the following description when considered in connection with the accompanying drawings, and the invention consists in the novel form, combination and arrangement of parts hereinafter more fully described, shown in the drawings and claimed.

In the drawings, wherein like reference characters indicate corresponding parts throughout the several views:

Figure 1 is a side elevational view of an electrode holder constructed in accordance with the present invention.

Figure 2 is a substantially central longitudinal sectional view thereof.

Figure 3 is a top plan view of the device shown in Figure 1, with the jaw covers and handles removed.

Fig. 4 is a top plan view of the lower tong member of the device shown in Figure 1.

Figure 5 is a bottom plan view of the upper tong member of the holder shown in Figure 1.

Figure 6 is an end elevational view looking toward the right of Figure 1.

Referring in detail to the drawings, the present electrode holder includes relatively short upper and lower tong members 5 and 5a, the upper tong member 5 including a jaw 6 provided with a renewable jaw plate and having an integral shank 7 projecting from one end thereof. The outer portion of shank 7 is of reduced width and downwardly enlarged to provide an ear 8, while the inner portion of shank 7 is extended rearwardly and upwardly and of cylindrical form, as shown at 9. The lower tong member includes a jaw 6a provided with a renewable jaw plate and having an integral shank 7a projecting from the inner end thereof, said shank having a narrow outer portion provided with a recess 10 longitudinally of and in the top thereof, and a wide inner end portion whose outer part has a recess 11 in the top thereof communicating with the recess 10, and whose inner part is of cylindrical form and provided with a rearwardly opening suitable socket 12 axially thereof. The inner end portion of shank 7a is formed with spaced longitudinal ribs 13 at the ends thereof, and fitted over this part of the shank 7a is a tubular handle 14 of insulating material. Air passages are thus formed between the inner end portion of shank 7a and handle 14 at the spaces between the ribs 13, to facilitate heat dissipation. The socket 12 is adapted to receive the end of a conductor 15 by means of which welding current is supplied to the tong member 5a, and a set screw 16 is threaded through shank 7a at the socket 12 to impinge the end of conductor 15 and retain it in the socket 12. As shown clearly in Figure 2, the head of set screw 16 is located in an aperture of handle 14 so as to be readily accessible.

The jaw 6 is provided on its under side with a longitudinal groove 17, while the jaw 6a is provided at the top and along each side with a series of gripping teeth 18. The arrangement is such that an end of an electrode may be held in the groove 17 and between the series of teeth 18 with the electrode projecting longitudinally of the holder, or an end of the electrode may be gripped between the jaws 6 and 6a transversely of the latter and between adjacent teeth 18, with the electrode projecting laterally from the holder. As shown clearly in Figures 1 and 2, a relatively short handle 19 of insulating material is fitted and secured on the rear portion 9 of the shank 7 of the upper tong member 5a, said handle 19 having a socket 20 for snug reception of said shank portion 9, and the handle 19 being secured on said shank portion 9 by a transverse screw 21'. The forward or outer portion of handle 19 snugly movably projects downwardly through a slot in the outer end portion of handle 14, as at 21, while the inner or rear portion of handle 19 is of reduced thickness or cut away at its under side so as to lie in spaced relation to handle 14. The upper surface of handle 19 is of upwardly arched form so as to curve downwardly at its rear end. Fixed upon the handle 14 directly rearwardly or inwardly of handle 19 is a guard 22 of transversely upwardly arched form and whose upper surface is substantially coextensive with the upper surface of handle 19 when the latter is in its normal raised position.

It will also be noted that the ear 8 of upper tong member 5 is received between the side walls of the outer portion of shank 7a and within the recess 10, a pivot pin 23 being extended transversely through said walls and said ear to pivotally connect the tong members. Thus, when handle 19 is pressed downwardly toward handle 14, the jaw 6 is moved upwardly away from jaw 6a, and when handle 19 is allowed to raise, jaw 6 is lowered into engagement with jaw 6a. These jaws are normally so engaged by spring means consisting of a helical compression spring 24 disposed between the handle 19 and the shank 7a inwardly of pivot 23. As shown clearly in Figure 2, the upper end of spring 24 is seated in a socket 25 provided in the under side of the forward thick portion of handle 19, while the lower end of spring 24 encircles the reduced inner end of a threaded bushing 26 adjustably threaded through an opening in the bottom of the portion of shank 7a provided with recess 11. By adjusting bushing 26, the tension of spring 24 may be regulated. The handle 14 is also provided with an opening 27 at the top and rearwardly of the opening at 21 to further promote dissipation of heat.

Cover plates 29 are respectively secured by screws 30 and 31 upon the upper surface of jaw 6 and the lower surface of jaw 6a, and these cover plates project beyond opposite sides of the jaws as well as beyond the outer ends thereof as respectively shown in Figure 6 and Figure 2. It is noted that the upper surface of jaw 6 and lower surface of jaw 6a are of transversely curved form, and the under surface of plate 29 for the upper jaw 6 and the upper surface of the plate 29 for the jaw 6a are of similar transverse curved form. More specifically, the upper surface of jaw 6 and the under surface of jaw 6a are of convex curvature, while the adjacent surfaces of cover plates 29 are of concave curvature. In this way, the full strength of the cover plates 29 is preserved and the projecting side portions of the cover plates are reinforced so that the latter will not be easily broken and will withstand the severe service to which they are put. This is a material advantage over cover plates of uniform thickness having thin right angled side flanges. The guard 22 serves to receive part of the impact in case the holder is dropped and the handle 19 strikes against the floor or other object. In this way, the handle 19 is protected against breakage, and the handle 19 is prevented from readily hooking onto other objects.

It will be noted that the tong members are of relatively short rugged form with considerable cross sectional thickness at all points, thereby providing ample current-carrying capacity and ability to withstand abuses to which electrode holders are often subjected. The compression spring 24 is entirely enclosed and shielded, and is protected from the heat of the welding arc, being thoroughly insulated by engaging in a socket of the insulating handle 19 at one end. It will be further noted that the shank portion 9 extends well into the handle 19 so as to effectively reinforce the latter against breakage.

From the foregoing description, it is believed that the construction and operation, as well as the advantages of the present invention, will be readily understood and appreciated by those skilled in the art.

What I claim as new is:

1. An electrode holder comprising upper and lower tong members, said upper tong member including a solid jaw having an integral shank projecting from the inner end thereof, said shank having a forward portion reduced in width to provide a depending ear and a rearwardly and upwardly extending rear portion, an insulating handle fitted and secured on said rear portion of the shank so as to completely enclose the latter, said lower tong member including a jaw having a shank integral with and projecting from its inner end, the shank of the lower tong member projecting inwardly beyond the shank of the upper tong member and including a narrow outer portion provided with a longitudinal recess in the upper side thereof receiving the ear of the upper tong member and a wider inner portion formed at its outer part with a wide recess in the top thereof and at its inner part with an axial socket, a pivot extending through the ear and the shank of the lower tong member to pivotally connect the tong members, a helical compression spring interposed between the shanks inwardly of the pivot for the tong members to normally yieldingly urge the jaw of the upper tong member into engagement with the jaw of the lower tong member, said spring being seated at one end in the insulating handle and at the other end in said wide recess, an adjustable bushing threaded through the shank of the lower tong member and receiving the lower end of said spring for adjusting the tension of the latter, and means to secure an end of a conductor in said socket of the lower tong member.

2. An electrode holder comprising upper and lower tong members having coacting jaws, the jaw of said upper tong member having an integral shank projecting from the inner end thereof, said shank having a rearwardly and upwardly extending rear portion, an insulating handle fitted and secured on said rear portion of the shank and completely enclosing the latter, the lower tong member having a handle projecting inwardly beyond the handle of the upper tong member, said insulating handle of the upper tong member having an upper surface of longitudinally upwardly curved form, and a guard mounted on the handle of the lower tong member directly inwardly of said insulating handle and having an inwardly inclined surface coextensive with the upper surface of said insulating handle.

3. The construction defined in claim 1, wherein a tubular insulating handle is removably fitted on the inner portion of the shank of the lower tong member, and wherein said tubular handle has an opening in the top thereof, said insulating handle of the upper tong member having a depending forward portion projecting downwardly through said opening.

HENRY J. WAGNER.